United States Patent
Hwang

(10) Patent No.: US 7,924,958 B2
(45) Date of Patent: Apr. 12, 2011

(54) APPARATUS AND METHOD FOR TRANSMITTING AND RECEIVING SIGNALS IN A MULTI-ANTENNA SYSTEM

(75) Inventor: Duck-Dong Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 958 days.

(21) Appl. No.: 11/712,082

(22) Filed: Feb. 28, 2007

(65) Prior Publication Data

US 2007/0211816 A1 Sep. 13, 2007

Related U.S. Application Data

(60) Provisional application No. 60/777,355, filed on Feb. 28, 2006.

(30) Foreign Application Priority Data

Jun. 30, 2006 (KR) .......................... 10-2006-0061102

(51) Int. Cl.
*H04B 1/10* (2006.01)

(52) U.S. Cl. ........ 375/349; 375/138; 375/229; 375/262; 375/341; 375/347

(58) Field of Classification Search .................. 375/130, 375/131, 138, 259–263, 267, 295, 299, 316, 375/322, 324–325, 340–341, 346, 347, 349
See application file for complete search history.

(56) References Cited

U.S. PATENT DOCUMENTS

| 4,829,378 | A | * | 5/1989 | LeGall | 375/240.11 |
|---|---|---|---|---|---|
| 6,493,399 | B1 | | 12/2002 | Xia et al. | |
| 6,975,666 | B2 | * | 12/2005 | Affes et al. | 375/130 |
| 7,002,900 | B2 | | 2/2006 | Walton et al. | |
| 7,248,647 | B2 | * | 7/2007 | Claussen et al. | 375/308 |
| 7,529,305 | B1 | * | 5/2009 | Tong et al. | 375/260 |
| 2004/0264557 | A1 | * | 12/2004 | Maruyama | 375/148 |
| 2005/0036576 | A1 | * | 2/2005 | Agazzi et al. | 375/348 |
| 2006/0087960 | A1 | * | 4/2006 | Kim et al. | 370/203 |
| 2006/0269022 | A1 | * | 11/2006 | Li et al. | 375/347 |
| 2008/0031375 | A1 | * | 2/2008 | Zhou et al. | 375/267 |
| 2009/0305690 | A1 | * | 12/2009 | Yuda et al. | 455/422.1 |

FOREIGN PATENT DOCUMENTS

| KR | 1020050054008 | 6/2005 |
|---|---|---|
| KR | 1020050120244 | 12/2005 |

* cited by examiner

*Primary Examiner* — David C Payne
*Assistant Examiner* — James M Perez
(74) *Attorney, Agent, or Firm* — NSIP Law

(57) ABSTRACT

An apparatus and method for transmitting and receiving a data stream in a multi-antenna system, in which a plurality of data streams are received, a plurality of code symbol sequences are generated by precoding the plurality of data streams, the code symbol sequences being mapped to the transmit antennas in a one-to-one correspondence, the code symbol sequences being delayed by delay times for the mapped transmit antennas, and the delayed code symbol sequences are transmitted through the mapped transmit antennas.

8 Claims, 2 Drawing Sheets

APPARATUS AND METHOD FOR TRANSMITTING AND RECEIVING SIGNALS IN A MULTI-ANTENNA SYSTEM

PRIORITY

This application claims the benefit under 35 U.S.C. §119(a) of a U.S. patent application filed in the U.S. Patent and Trademark Office on Feb. 28, 2006 and assigned Ser. No. 60/777,355 and a Korean Patent Application filed in the Korean Intellectual Property Office on Jun. 30, 2006 and assigned Serial No. 2006-61102, the contents of each of which are incorporated herein by reference.

BACKGROUND OF THE INVENTION

1. Field of the Invention

The present invention generally relates to a wireless communication system. More particularly, the present invention relates to an apparatus and method for transmitting and receiving signals in a Multiple-Input Multiple-Output (MIMO) communication system.

2. Description of the Related Art

In general, a transmission signal experiences more severe distortion in a wireless environment than in a wired environment due to various factors, such as multipath fading, attenuation, time-variant noise, interference, etc. Multipath fading is closely related to reflection from terrestrial objects or movement of a user. A distorted version of a signal transmitted on a fading channel arrives at a receiver, thus degrading the whole system performance. The fading phenomenon is one of the critical factors impeding high-speed data communications in wireless environments. Therefore, loss of a radio channel caused by fading and interference between users is a challenging issue to tackle in order to implement high-speed data transmission in wireless environments.

To overcome fading, spatial diversity-based transmission schemes have been proposed and are under active research. Spatial diversity techniques include Transmit (Tx) antenna diversity using multiple Tx antennas and Receive (Rx) antenna diversity using multiple Rx antennas. A system for achieving spatial diversity using multiple Tx/Rx antennas is called a MIMO system.

A MIMO system decides what data to send through each of multiple Tx antennas by space-time coding, and Rx antennas each receive signals from the Tx antennas and perform space-time decoding.

Compared to space-time coding schemes, spatial diversity schemes send different data streams through different Tx antennas, thereby enabling high-speed data transmission and achieving a multiplexing gain as well.

In spatial diversity schemes, a receiver decodes a received signal by joint or separate detection. A joint detection process takes into account a signal transmitted by one Tx antenna as well as signals transmitted by other Tx antennas.

Due to this feature, Maximum Likelihood (ML) decoding is known as an optimal decoding process for a spatial diversity-MIMO system. ML decoding offers a diversity order equal to a number of Rx antennas irrespective of a number of Tx antennas. ML decoding outperforms other decoding processes, such as Minimum Mean Square Error (MMSE) or Zero Forcing (ZF), in terms of Signal-to-Noise Ratio (SNR). An SNR gain increases in proportion to the number of Tx antennas.

However, a MIMO system using such a multiplexing scheme can achieve a multiplexing gain only without a Tx diversity effect. In contrast, a space time coding scheme can improve reception reliability with a diversity gain but is not favorable for high-speed data transmission. Accordingly, a need exists for developing a Full Diversity Full Rate (FDFR) scheme that achieves a diversity gain with a minimized decrease in data rate.

SUMMARY OF THE INVENTION

The present invention addresses at least the problems and/or disadvantages described above and provides at least the advantages described below. Accordingly, an aspect of the present invention is to provide an apparatus and method for transmitting and receiving signals, which can send a plurality of data streams simultaneously so both Tx spatial diversity and Rx spatial diversity can be achieved.

Another aspect of the present invention provides a transmission apparatus and method for delaying data streams by different time periods and sending the delayed data streams.

A further aspect of the present invention provides a reception apparatus and method for decoding received data streams, taking into account time delays set by a transmitter.

In accordance with an aspect of the present invention, there is provided an apparatus for transmitting a data stream in a multi-antenna system, in which a plurality of transmit antennas are provided, a precoder receives a plurality of data streams, generating a plurality of code symbol sequences by precoding the plurality of data streams, and outputs the code symbol sequences with respect to the transmit antennas mapped to the code symbol sequences, and a delay portion delays the code symbol sequences by delay times for the mapped transmit antennas and transmits the delayed code symbol sequences through the mapped transmit antennas.

In accordance with another aspect of the present invention, there is provided a method for transmitting a data stream in a multi-antenna system, in which a plurality of data streams are received, a plurality of code symbol sequences are generated by precoding the plurality of data streams, the code symbol sequences being mapped the transmit antennas in a one-to-one correspondence, the code symbol sequences are delayed by delay times for the mapped transmit antennas, and the delayed code symbol sequences are transmitted through the mapped transmit antennas.

In accordance with a further aspect of the present invention, there is provided an apparatus for receiving a data stream in a multi-antenna system, in which an interference canceler separates a received signal into a plurality of symbol sequences, a number of the transmission symbol sequences being equal to a number of transmitted symbols and eliminates interference components from symbol sequences using reconstructed signals received for the symbol sequences, a channel matrix transformation portion eliminates an interference component caused by a later signal from the interference-free symbol sequences by channel matrix transformation, a delay portion delays the channel matrix-transformed symbol sequences received from the channel matrix transformer by delay times, a decoder creates estimates of the transmitted symbols by decoding the delayed symbol sequences using a channel matrix estimate, an encoder encodes the transmitted symbol estimates by a precoder, and a reconstructor generates reconstructed signals by code symbols received from the encoder by channel matrices corresponding to the code symbols and provides the reconstructed signals to the interference canceler.

In accordance with still another aspect of the present invention, there is provided a method for receiving a data stream in a multi-antenna system, in which a received signal is separated into a plurality of symbol sequences, a number of the transmission symbol sequences being equal to a number of transmitted symbols, interference components are eliminated from the symbol sequences using reconstructed signals received for the symbol sequences, an interference component caused by a later signal is eliminated from interference-free symbol sequences by channel matrix transformation, channel matrix-transformed symbol sequences are delayed by delay times, estimates of transmitted symbols are created by decoding delayed symbol sequences using a channel matrix estimate, the transmitted symbol estimates are encoded by a precoder, and reconstructed signals are generated by code symbols by channel matrices corresponding to the code symbols.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description, such as a detailed construction and elements, are provided to assist in a comprehensive understanding of the preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a multi-antenna system in which a transmitter delays data streams by different times prior to transmission and a receiver recovers the data streams from a received signal, taking into account delay times. For this purpose, a transmitter and a transmission method for delaying a plurality of data streams by different times will be described. Also, a receiver and a reception method will be described for recovering received data streams, taking into account delay times.

In accordance with the present invention a different delay time is applied to each data stream. For example, only one symbol of symbols supposed to be sent at the same transmission time is sent at the transmission time and the other symbols are sent sequentially at subsequent transmission times. That is, data streams other than the one data stream are delayed by integer multiples of a symbol transmission interval.

Figure 1:
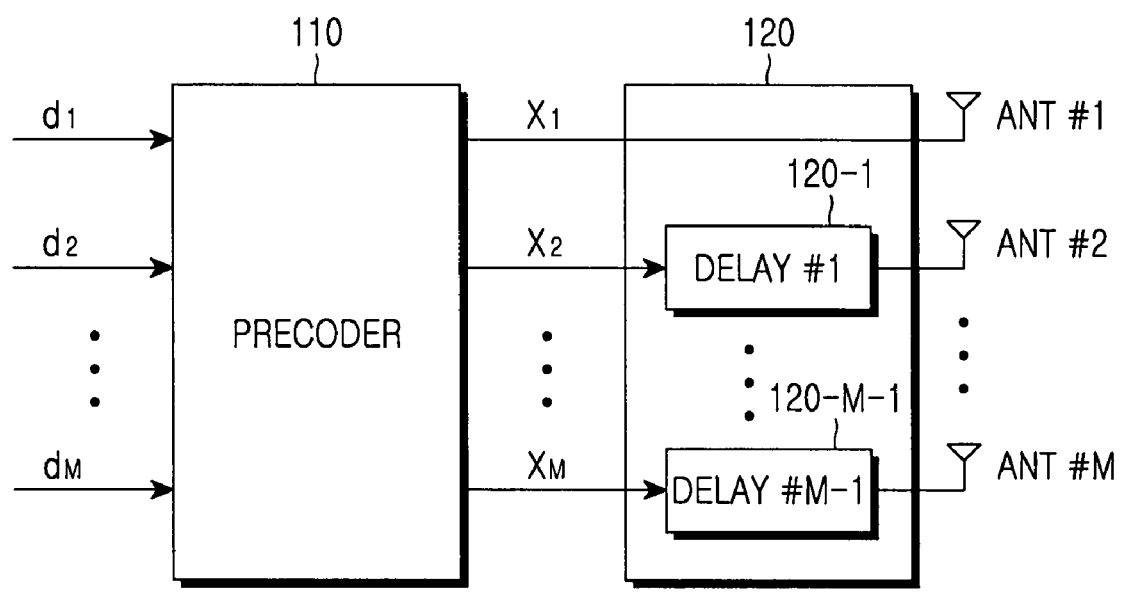
FIG. 1 is a block diagram of a transmitter in a MIMO system according to the present invention.

FIG. 1 shows a transmitter in a MIMO system according to the present invention. A plurality of data streams or vectors are provided to a precoder 110. A set of bits provided to the precoder 110 at a given time instant among the data streams is expressed as $D=[d_1, d_2, \ldots, d_M]$. In FIG. 1, the number of input data streams is equal to the number of transmit antennas.

The precoder 110 multiplies the plurality of data vectors by a transform matrix F. This precoding spreads the energy of each input symbol to all transmit antennas. The number of the precoded symbols is also equal to that of the transmit antennas. That is, each code symbol sequence is mapped to one transmit antenna. The precoding is a process of creating a new data stream by rearranging bits of each data stream for transmission at a transmission time interval. Hence, bits from different data streams exist in each code symbol sequence.

A code symbol set output from the precoder 110 at a given time instant for the code symbol sequences is denoted by $[x_1, x_2, \ldots, x_M]$. For J transmission time intervals, the code symbol matrix X from the precoder 110 is expressed as Equation (1), $$X = \begin{bmatrix} x_{11} & x_{12} & \cdots & x_{1J} \\ x_{21} & x_{22} & \cdots & x_{2J} \\ \vdots & \vdots & \vdots & \vdots \\ x_{M_T 1} & x_{M_T 2} & \cdots & x_{M_T J} \end{bmatrix} \quad (1)$$

where $x_{m,j}$ denotes a symbol output from the precoder 110 at a transmission time interval j, for transmission through an $m^{th}$ transmit antenna ($1 \leq m \leq M_T$). J can be set according to system performance.

Assuming that $M_T$ is 3 and J is 5, the matrix X is given as Equation (2).

$$X = \begin{bmatrix} x_{11} & x_{12} & x_{13} & x_{14} & x_{15} \\ x_{21} & x_{22} & x_{23} & x_{24} & x_{25} \\ x_{31} & x_{32} & x_{33} & x_{34} & x_{35} \end{bmatrix} \quad (2)$$

One of the code symbol sequences from the precoder 110 is sent to a transmit antenna, while the other code symbol sequences are provided to delays.

In FIG. 1, a first data symbol sequence $x_1$ of the code symbol sequences is provided to a first transmit antenna (ANT #1) and the other code symbol sequences are provided to delays 120-1 to 120-M-1. Specifically, a second data symbol sequence $x_2$ is provided to a first delay 120-1 (delay #1) and an $M^{th}$ data symbol sequence $x_2$ is provided to an $(M-1)^{th}$ delay 120-M-1 (delay #M-1).

A delay portion 120 including the delays 120-1 to 120-M-1 delay the code symbol sequences by different times. The number of the delays 120-1 to 120-M-1 is equal to one less than the number of transmit antennas.

Each delay delays the received code symbol sequence by a predetermined time. The delay time is calculated by $Z^{-(m-1)}$ where m is an index of a transmit antenna ($1 \leq M \leq M_T$) and Z is a delay coefficient that determines how long a delay delays an input signal. For example, the delay coefficient can be decided according to a symbol transmission interval. The symbol transmission interval is defined as the time interval between transmission of one symbol and transmission of the next symbol in a code symbol sequence.

If the code symbol sequences expressed as Equation (2) are output, a symbol matrix X output from the delay portion 120 is expressed as Equation (3).

$$X = \begin{bmatrix} x_{11} & x_{12} & x_{13} & x_{14} & x_{15} & 0 & 0 \\ 0 & x_{21} & x_{22} & x_{23} & x_{24} & x_{25} & 0 \\ 0 & 0 & x_{31} & x_{32} & x_{33} & x_{34} & x_{35} \end{bmatrix} \quad (3)$$

As noted from Equation (3), symbols supposed to be sent during five transmission time intervals are sent during seven transmission time intervals. No symbol transmission occurs at positions without any transmission symbols due to the time delays. The number of positions without symbols is $1 \times (1, \ldots +M_{T-1})$. The symbol sequences of Equation (3) are sent through their mapped transmit antennas.

Figure 2:
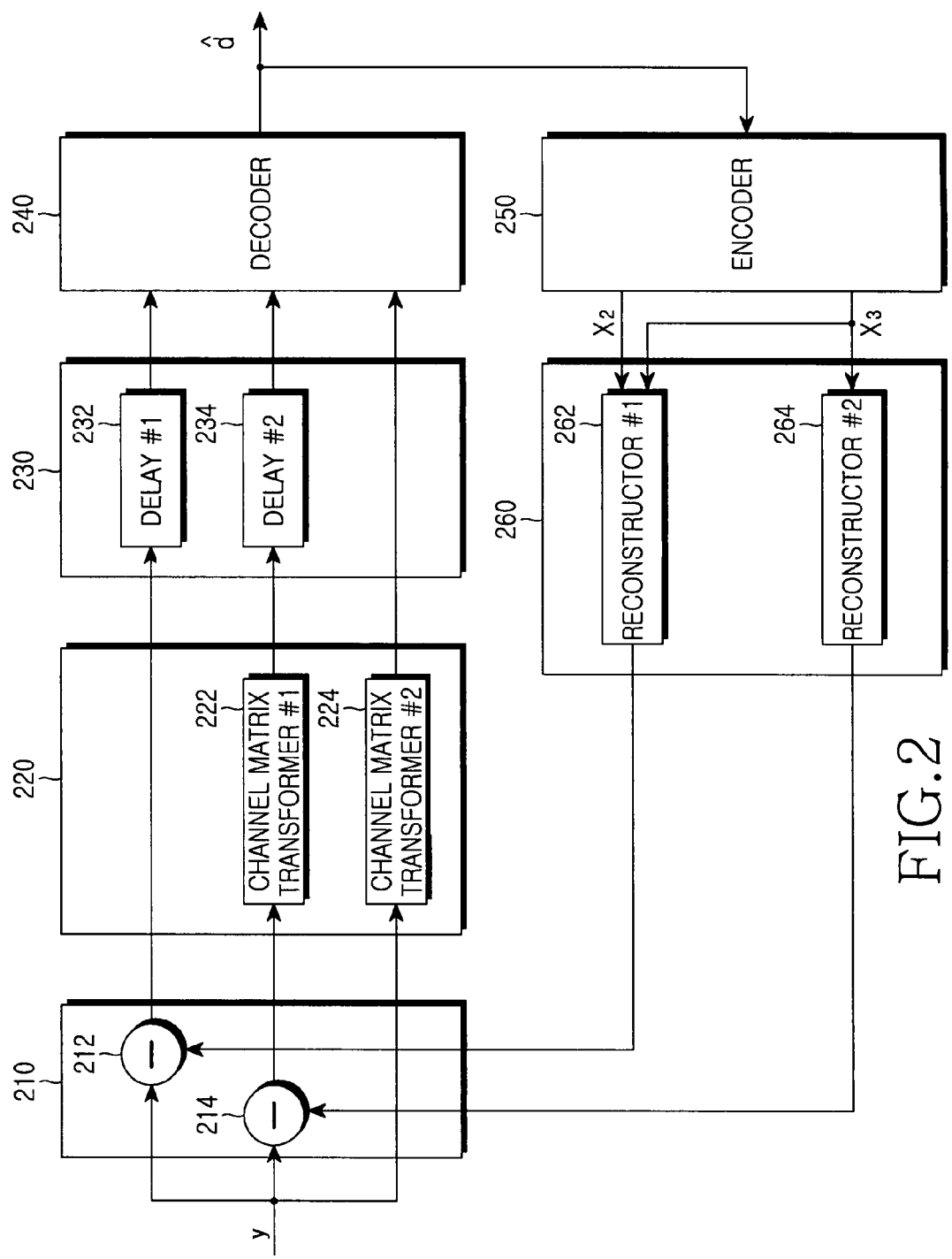
FIG. 2 is a block diagram of a receiver in the MIMO system according to the present invention.

FIG. 2 shows a receiver in the MIMO system according to the present invention. A signal received through at least one receive antenna is provided to an interference canceler 210. For a MIMO system with $n_T$ transmit antennas and $n_R$ receive antennas, the received signal y is expressed as Equation (4), $$\underbrace{\begin{pmatrix} y_1 \\ y_2 \\ \vdots \\ y_{n_R} \end{pmatrix}}_{y} = \underbrace{\begin{pmatrix} h_{11} & h_{12} & \cdots & h_{1n_T} \\ h_{21} & h_{22} & \cdots & h_{1n_T} \\ \vdots & \vdots & \ddots & \vdots \\ h_{n_R 1} & h_{n_R 2} & \cdots & h_{n_R n_T} \end{pmatrix}}_{H} \underbrace{\begin{pmatrix} x_1 \\ x_2 \\ \vdots \\ x_{n_T} \end{pmatrix}}_{x} + \underbrace{\begin{pmatrix} z_1 \\ z_2 \\ \vdots \\ z_{n_R} \end{pmatrix}}_{z} \quad (4)$$

where $x_i$ (i=1, 2, ..., $n_T$) is a signal transmitted from an $i^{th}$ transmit antenna, $y_i$ (i=1, 2, ..., $n_R$) is a signal received at an $i^{th}$ receive antenna, and $z_i \sim N(0, \sigma^2_z)$ (i=1, 2, ..., $n_R$) is Gaussian noise.

As stated before, FIG. 2 shows a receiver in the MIMO system with $n_T=3$. Therefore, the received signal y is given as Equation (5), $$y = [h_1 h_2 h_3] \begin{bmatrix} x_1 \\ x_2 \\ x_3 \end{bmatrix} + \text{noise} \quad (5)$$

where $h_1$, $h_2$, and $h_3$ are channel vectors.

One of the transmission symbols $x_1$, $x_2$, $x_3$ in Equation (5) is sent with no time delay and the other two transmission symbols are delayed by different times, prior to transmission, as described regarding the transmitter. Therefore, the receiver processes the received signal, taking into account the time delays of the transmission symbols.

The interference canceler 210 eliminates a signal already decoded by a decoder 240 at a current reception time from the received signal, i.e. cancels interference of a previous signal vector with a current signal vector from the received signal. Specifically, the received signal is separated into as many transmission symbol sequences as the transmission symbols that form the signal x and the interference canceler 210 subtracts interference components from the transmission symbol sequences using subtractors 212 and 214. The interference components are reconstructed signals. They are created by encoding feedback information from the decoder 240 in an encoder 250 and then multiplying the code symbols by channel vectors corresponding to the symbols in a reconstructor 260.

A channel matrix transformation portion 220 eliminates interference caused by not-yet decoded symbols, i.e. interference caused by a signal later than the current decoded signal from the interference-free transmission symbol sequences.

If the channel matrix at the current reception time is represented by Equation (6), transform matrices used in channel matrix transformers 222 and 224 are defined as Equation (7) and Equation (8), respectively.

$$H = [\vec{h}_1 \vec{h}_2 \vec{h}_3] \quad (6)$$

$$\dot{H} = I_M - \vec{h}_1 \vec{h}_1^+ / |\vec{h}_1|^2 \quad (7)$$

$$\ddot{H} = I_M - [\vec{h}_1 \vec{h}_2]([\vec{h}_1 \vec{h}_2]^+ [\vec{h}_1 \vec{h}_2])^{-1} [\vec{h}_1 \vec{h}_2]^+ \quad (8)$$

A delay portion 230 compensates for time delays of the transformed transmission symbol sequences, that is, compensates for delays set by the transmitter. Therefore, transmission symbol sequences output from the delay portion 230 are arranged in an output order of the precoder of the transmitter. The delay portion 230 includes a plurality of delays 232 and 234. The delay 232 transfers the transmission symbol sequence that was not delayed in the transmitter using no delay time or using an appropriately designated delay time, such as non-delay time or the like. This transmission symbol sequence is simply output without any delay.

The decoder 240 decodes the distorted transmission symbols received from the delay portion 230 using the channel matrix estimated at the reception time and a precoding matrix used in the precoder, thus outputting estimated transmission symbols, $x_1$, $x_2$ and $x_3$. The estimated channel matrix is defined as Equation (9), $$H'F = [\vec{h}_1 \dot{h}_2 \ddot{h}_3] \quad (9)$$

where F is the preceding matrix. Equation (9) is based on the premise shown by Equation 10.

$$\dot{H}^+ H = [[\dot{h}_1 \dot{h}_2 \dot{h}_3]]$$

$$\ddot{H}^+ H = [\ddot{h}_1 \ddot{h}_2 \ddot{h}_3] \quad (10)$$

The encoder 250 encodes estimates of the transmitted signals $x_1$, $x_2$ and $x_3$ in the same manner as done in the transmitter. The reconstructor 260 reconstructs the code symbols in the form of transmission symbols. Symbol reconstruction is carried out to create interference components which will be eliminated from the received signal. Interference components, i.e. the reconstructed signals, are represented by Equations (11) and (12).

$$\vec{h}_2 z^{-1}(x_2) + \vec{h}_3 z^{-2}(x_3) \quad (11)$$

$$\vec{h}_3 z^{-1}(x_3) \quad (12)$$

The reconstructed signals are fed back to the interference canceler 210.

To achieve better performance, $x_1$ is found by a forward operation, $x_2$ is found by performing the same operation reversely, and one of $x_1$ and $x_2$ that minimizes the Frobenius norm of Y-HX is finally selected. The Frobenius norm of matrix A is the trace of AA' (A' is the Hermitian transpose of A). Meanwhile, a linear receiver, such as an MMSE receiver for H'F, can substitute an ML or sphere decoder.

Application of the present invention to an Orthogonal Frequency Division Multiplexing (OFDM) system with N subcarriers can bring about frequency diversity. When a precoder of size MN is used for the OFDM system, the precoder can generate matrices $x_1, x_2, \ldots, x_N$ for the subcarriers.

In accordance with the present invention as described above, a transmitter applies different time delays to different transmission symbol sequences and a receiver decodes transmission symbols, taking into account the time delays. Therefore, full rate performance as well as full diversity performance is achieved.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:
1. An apparatus for receiving a data stream in a multi-antenna system, the apparatus comprising:

an interference canceler for separating a received signal into a plurality of symbol sequences, a number of transmission symbol sequences being equal to a number of transmitted symbols, and eliminating interference components from symbol sequences using reconstructed signals received for the symbol sequences;

a channel matrix transformation portion for eliminating an interference component caused by a later signal from interference-eliminated symbol sequences by channel matrix transformation;

a delay portion for delaying channel matrix-transformed symbol sequences received from the channel matrix transformation portion by delay times;

a decoder for creating estimates of the transmitted symbols by decoding delayed symbol, sequences using a channel matrix estimate;

an encoder for encoding the transmitted symbol estimates by a precoder; and a reconstructor for generating the reconstructed signals by code symbols received from the encoder by channel matrices corresponding to the code symbols and providing the reconstructed signals to the interference canceler, wherein the later signal includes not-yet decoded symbols and is a signal later than the current decoded signal.

2. The apparatus of claim 1, wherein the interference canceler comprises subtractors mapped, in a one-to-one correspondence, to symbol sequences other than a symbol sequence with no time delay, wherein each of the subtractors subtracts the reconstructed signals from received symbol sequences.

3. The apparatus of claim 2, wherein the channel matrix transformation portion comprises channel matrix transformers mapped, in a one-to-one correspondence, to interference-free symbol sequences other than an interference-free symbol sequence with no time delay, wherein each of the channel matrix transformers eliminates the interference component caused by the later signal from a received interference-free symbol sequence.

4. The apparatus of claim 3, wherein the delay portion comprises delays mapped, in a one-to-one correspondence, to channel matrix-transformed symbol sequences other than a channel matrix-transformed symbol sequence with no time delay, wherein each of the delays delays a received channel matrix-transformed symbol sequence by a delay time to compensate for a delay used for the received channel matrix-transformed symbol sequence by a transmitter.

5. A method for receiving a data stream in a multi-antenna system, the method comprising:
separating a received signal into a plurality of symbol sequences, a number of transmission symbol sequences being equal to a number of transmitted symbols;
eliminating interference components from symbol sequences using reconstructed signals received for the symbol sequences;
eliminating an interference component caused by a later signal from interference-eliminated symbol sequences by channel matrix transformation;
delaying channel matrix-transformed symbol sequences by delay times;
creating estimates of the transmitted symbols by decoding the delayed symbol sequences using a channel matrix estimate;
encoding the transmitted symbol estimates by a precoder; and
generating the reconstructed signals by code symbols by channel matrices corresponding to the code symbols,
wherein the later signal includes not-yet decoded symbols and is a signal later than the current decoded signal.

6. The method of claim 5, wherein the interference cancellation comprises subtracting the reconstructed signals from received symbol sequences by subtractors mapped, in a one-to-one correspondence, to symbol sequences other than a symbol sequence with no time delay.

7. The method of claim 6, wherein the channel matrix transformation comprises eliminating the interference component caused by the later signal from received interference-free symbol sequences by channel matrix transformers mapped, in a one-to-one correspondence, to interference-free symbol sequences other than an interference-free symbol sequence with no time delay.

8. The method of claim 7, wherein the delaying comprises delaying received transformed symbol sequences according to time delays used in a transmitter by delays mapped, in a one-to-one correspondence, to transformed symbol sequences other than a transformed symbol sequence with no time delay.

* * * * *